Patented Apr. 29, 1941

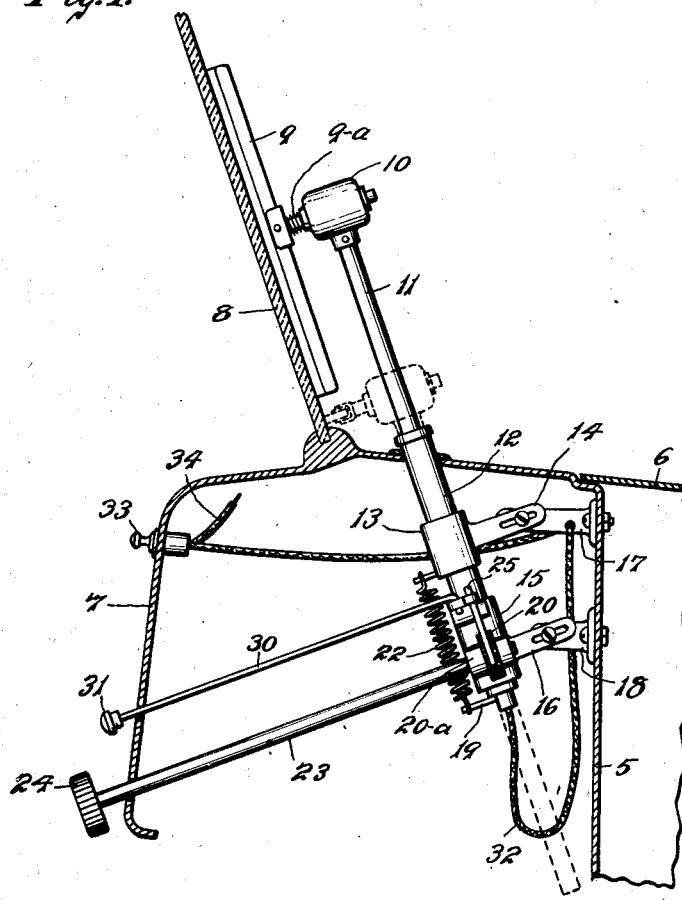
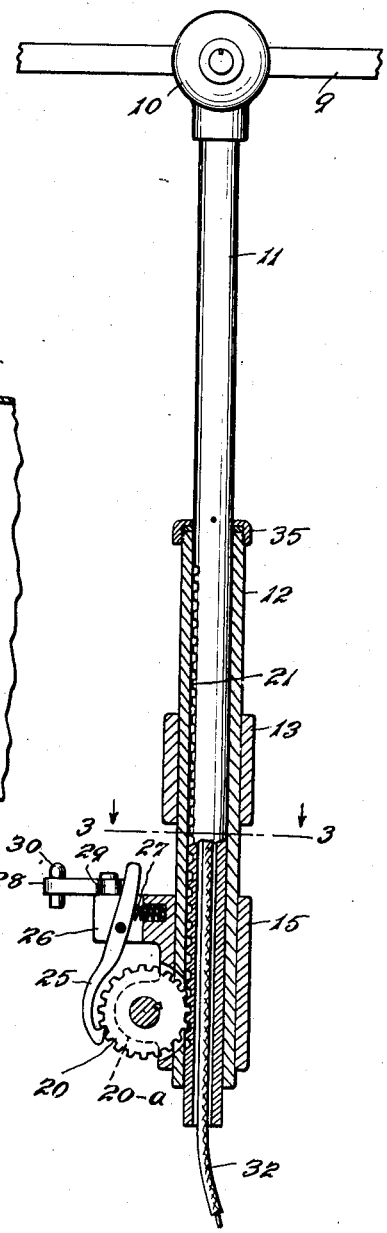
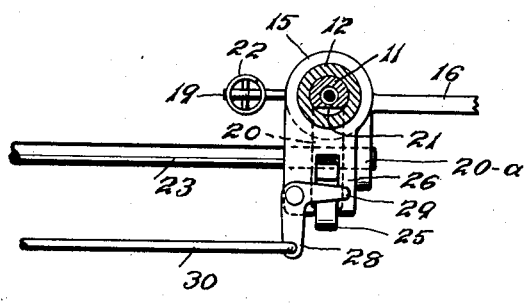

2,239,754

UNITED STATES PATENT OFFICE 2,239,754

WINDSHIELD WIPER

Antonio Marti, Hartford, Conn.

Application December 1, 1939, Serial No. 307,006

3 Claims. (Cl. 15—250)

This invention relates to windshield wipers and has, for an object thereof, to provide a windshield wiper which is particularly adapted for keeping windshields free of rain and frost.

A further object of the invention is to provide a windshield wiper which may be readily moved to operating position, when it is to be used, and removed from said position, when not needed, in order to eliminate obstruction to the view through the windshield.

A further object is to provide such a wiper which may be quickly placed into operating position and removed therefrom by the simple operation of pressing a button or rotating a knob on the instrument board of a motor vehicle.

Further objects of the invention will be clearly understood from the following description and from the accompanying drawing in which—

Fig. 1 is a fragmentary side view, in vertical section, through a portion of the cowl and windshield of a vehicle, with the wiper embodying my invention shown in elevation.

Fig. 2 is a front view, partly in section, of my improved windshield wiper.

Fig. 3 is a plan view on line 3—3 of Fig. 2.

As shown in the drawing, the numeral 5 denotes the cowl board of a motor vehicle, 6 the hood, 7 the instrument board and dash and 8 the windshield.

My invention comprises a wiper blade 9 which is rotated by an electric motor 10 that is mounted on a slide bar 11 which is slidably mounted within a sleeve 12. The said wiper blade is pressed against the surface of the windshield by means of a spring 9a in order to insure proper contact with the windshield.

The said sleeve 12 is provided with a collar 13 having an extension 14, and another collar 15 having an extension 16, and is supported by means of brackets 17 and 18 which are mounted upon the cowl board 5.

The extensions 14 and 16 are slotted in order to provide for adjustably mounting the sleeve at the proper angle to conform with the angle of the windshield 8 and are secured to the brackets by screws or other suitable means.

A pinion 20 is rotatably mounted in bosses 20a which project from the collar 15 and the said pinion meshes with teeth 21 on the slide bar 11.

A spring 22 is anchored, preferably upon the collar 13 at one end, and the other end thereof is secured, by a pin 19, to the lower portion of the bar 11 which projects below the end of the sleeve 12, for raising the said slide bar to move the wiper to its wiping position. A shaft 23 extends from the pinion 20 through the instrument board 7 and has, at the end thereof, a knob 24 for rotating the said pinion to lower the bar 11. A pawl 25 is pivotably mounted in a boss 26 which projects from the collar 15 and is pressed into engagement with the teeth of the pinion by means of a spring 27 to prevent rotation of said pinion by the tension of the spring 22 when the bar 11 is in a lowered position as indicated by dotted lines in Fig. 1.

A bell crank lever 28 is pivoted on the boss 26 and has an extension 29 which engages the pawl 25 for moving the same, against the tension of the spring 27, to release the pinion 19.

A rod 30 is connected to said lever and extends through the instrument board 7 and has a button 31 at its end for operating the lever 28.

The slide bar 11 is hollow to receive an electric conductor 32 which connects an electric circuit to the motor 10, the said conductor being connected to an electric switch 33 which is connected, by means of a condenser 34, to one side of an electric battery, not shown, and the motor 10 is grounded to the other side of said battery in order to establish an electric circuit therethrough.

The operation of my invention is as follows:

When the wiper is not in use, the bar 11 is lowered so that the motor 10 and the blade 9 are in the position indicated in dotted lines in Fig. 1.

When it is desired to put the said wiper into operation, the button 31 is pressed. This operates the pawl 25 to release the pinion 20 and the spring 22 will quickly raise the bar 11 with the motor and wiper to the operating position. The switch 33 may then be operated to close the electric circuit to the motor. The said motor will rotate the blade 9 at such a high speed that it will be practically invisible and so that, at the same time, it will remove rain or other moisture from the windshield so rapidly that it will keep the windshield sufficiently dry to prevent the formation of frost upon the windshield in cold weather.

When the wiper is not needed, the motor and wiper blade may be lowered to the position shown in dotted lines by simply rotating the knob 24 in a contra-clockwise direction.

After the wiper has been moved to its uppermost position, by operation of the button 31, it may be lowered to any particularly desired position, to conform with the height of the driver, by simply rotating the knob 24 and the wiper will be held in that position by means of the pawl 25.

It will be noted that the teeth 28 are so disposed upon the slide bar 11 that they will not be exposed above the top of the sleeve 12 when the wiper is in its operating position. This is particularly intended in order to prevent the leakage of moisture through the sleeve 12 and additional precaution is taken against said leakage by the provision of a packing which is retained in the top of the sleeve 12 by a collar 35.

I claim:

1. A windshield wiper comprising a support including a sleeve, a bar slidable in said sleeve on an axis parallel to the axis of a windshield, driving means carried by said bar, a wiper blade rotatable by said driving means, a pinion on said support meshing with teeth on said bar, means urging said bar to a raised position, retaining means engaging said pinion to retain said bar against movement by said urging means, manually operable means for releasing said retaining means to permit said bar to be raised by said urging means, and manually operable means for rotating said pinion to lower said bar.

2. For a vehicle comprising a body having a windshield and an instrument board, a windshield wiper including a support mounted in said body, a bar slidable in said support and projecting out of said body in front of said windshield, driving means carried by said bar, a wiper blade rotatable by said driving means in contact with said windshield, a pinion engaging teeth on said bar, means comprising a spring for urging said bar to move said wiper blade into wiping position, a pawl for engaging said pinion to prevent movement of said bar by said spring, means for operating said pawl from said instrument board to release said pinion and permit movement of said blade to wiping position, and supporting means operable from said instrument board to rotate said pinion for retracting said wiper blade from wiping position.

3. In a vehicle comprising a cowl board and windshield, a wiper including mechanism having a sleeve extending through said body with its axis parallel to said windshield, a bracket secured to said cowl board, means on said sleeve for adjustably securing the same to said bracket, a motor slidably carried by said mechanism, and a wiper blade operated by said motor in engagement with said windshield.

ANTONIO MARTI.